(12) United States Patent
Bhat et al.

(10) Patent No.: US 9,552,920 B2
(45) Date of Patent: Jan. 24, 2017

(54) CONTACTLESS POWER TRANSFER SYSTEM

(75) Inventors: Suma Memana Narayana Bhat, Bangalore (IN); Adnan Kutubuddin Bohori, Bangalore (IN); Neeraj Kamal Singh Kumar, Agra (IN); Somakumar Ramachandrapanicker, Bangalore (IN)

(73) Assignee: General Electric Company, Niskayuna, NY (US)

( * ) Notice: Subject to any disclaimer, the term of this patent is extended or adjusted under 35 U.S.C. 154(b) by 790 days.

(21) Appl. No.: 13/096,372

(22) Filed: Apr. 28, 2011

(65) Prior Publication Data

US 2012/0025942 A1 Feb. 2, 2012

Related U.S. Application Data

(63) Continuation-in-part of application No. 12/845,133, filed on Jul. 28, 2010.

(51) Int. Cl.
*H02J 7/00* (2006.01)
*H01F 38/14* (2006.01)
(Continued)

(52) U.S. Cl.
CPC .............. *H01F 38/14* (2013.01); *B60L 3/0069* (2013.01); *B60L 3/04* (2013.01); *B60L 11/182* (2013.01); *B60L 11/1824* (2013.01); *B60L 11/1842* (2013.01); *B60L 2200/26* (2013.01); *B60L 2210/30* (2013.01); *B60L 2210/40* (2013.01); *B60L 2230/12* (2013.01); *B60L 2230/14* (2013.01); *B60L 2250/10* (2013.01); *B60L 2250/16* (2013.01); *Y02E 60/721* (2013.01); *Y02T 10/7005* (2013.01);
(Continued)

(58) Field of Classification Search
CPC .............. B60L 2210/30; B60L 2210/40; Y02T 10/7005; Y02T 10/7088
USPC . 320/104, 108, 109, 134; 180/65.1; 903/903
See application file for complete search history.

(56) References Cited

U.S. PATENT DOCUMENTS 5,311,973 A * 5/1994 Tseng et al. .................... 191/10
5,850,135 A * 12/1998 Kuki et al. .................... 320/108
(Continued)

FOREIGN PATENT DOCUMENTS

| EP | 2196351 A1 | 6/2010 |
| JP | 2009106136 A | 5/2009 |
| WO | WO2007008646 A2 | 1/2007 |

OTHER PUBLICATIONS

A. Bohori et al., "Contactless Power Transfer System and Method," U.S. Appl. No. 13/731,497, filed Mar. 25, 2010.
(Continued)

*Primary Examiner* — Edward Tso
*Assistant Examiner* — Aaron Piggush
(74) *Attorney, Agent, or Firm* — Joseph J. Christian

(57) ABSTRACT

A system, such as a charging system, is provided. The system can include a coil. A connection module can be coupled to the coil and configured to allow the coil to communicate with an energy source to generate a magnetic field. A field-focusing element can be included, the field-focusing element acting to focus the magnetic field when the magnetic field varies in time at a predetermined rate. In one embodiment, the field-focusing element may be configured to focus the magnetic field in an area separated from the coil by at least about 5 cm.

5 Claims, 8 Drawing Sheets

(51) Int. Cl.
  *B60L 11/18* (2006.01)
  *B60L 3/00* (2006.01)
  *B60L 3/04* (2006.01)

(52) U.S. Cl.
  CPC ........ *Y02T 10/7088* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y04S 10/126* (2013.01)

(56) References Cited

U.S. PATENT DOCUMENTS

| | | | | |
|---|---|---|---|---|
| 6,157,162 | A | * | 12/2000 | Hayashi et al. ............ 320/104 |
| 6,960,968 | B2 | | 11/2005 | Odendaal et al. |
| 7,323,964 | B1 | | 1/2008 | Shyu et al. |
| 7,741,734 | B2 | | 6/2010 | Joannopoulos et al. |
| 2008/0265684 | A1 | | 10/2008 | Farkas |
| 2010/0123530 | A1 | | 5/2010 | Park et al. |
| 2010/0277121 | A1 | * | 11/2010 | Hall et al. .................... 320/108 |

OTHER PUBLICATIONS

Karalis et al., "Efficient Wireless Non-Radiative Mid-Range Energy Transfer", Annals of Physics, vol. 323, pp. 34-48, 2008.

Mazlouman et al., "Mid-Range Wireless Energy Transfer Using Inductive Resonance for Wireless Sensors", Proceedings of the 2099 IEEE International Conference on Computer Design, pp. 517-522, 2009.

Kurs et al., "Wireless Power Transfer via Strongly Coupled Magnetic Resonances", Science, vol. 317, pp. 83-86, Jul. 6, 2007.

"Wireless/Contactless Power Supply: Inductively Converter Solutions", found at http://www.ufindbook.com/ebook-science-engineering/wireless-contactless-power-supply-inducti . . . , printed on Feb. 18, 2011.

* cited by examiner

CONTACTLESS POWER TRANSFER SYSTEM

RELATED APPLICATIONS

The present application is a continuation-in-part of U.S. patent application Ser. No. 12/845,133, filed on Jul. 28, 2010, which is incorporated herein by reference in its entirety.

BACKGROUND

Embodiments presented herein generally relate to contactless energy transfer systems and, in particular, to contactless energy transfer for plug-in-hybrid and electric vehicles.

A typical motor vehicle with an internal combustion engine has a battery that is used predominantly for providing power to crank the engine to start the vehicle. Charging of the battery is usually done via an alternator driven by the engine. However, in a plug-in-hybrid or all-electric vehicle, the battery typically provides the power required to drive the vehicle, supplying energy to an electric motor coupled to a drive shaft of the vehicle. The battery in a plug-in-hybrid or all electric vehicle therefore typically needs to be charged from external source of electricity.

To date, most electric vehicle charging systems include contact based charging connectors having plug and socket connectors for contact-based charging. Contact based charging connector systems may have several disadvantages. For example, in outdoor applications, environmental impact may cause corrosion and damage of electrical contacts. Further, in view of the high currents and voltages often required to recharge electric vehicle batteries, establishing the physical connection for contact-based charging may involve cumbersome safety measures.

Contactless inductive charging systems are also available to charge electric vehicle batteries. Such systems often utilize a split core transformer configuration to avoid exposed electrical contacts. However, existing inductive charging systems often require that the coils of the transformer be held in close proximity during charging in order to achieve acceptable energy transfer efficiency, and this may result in reliability issues due to the small clearances between different parts of the charging system. Further, existing inductive charging systems are usually cord-based systems, thereby exhibiting the cord-related issues discussed above.

BRIEF DESCRIPTION

In one aspect, an apparatus, such as an electrical system, is provided. The electrical system can include a pair of conductors across which an arc is sporadically supported, the arc including load current from a load circuit. The electrical system can also include an energy source that is separate from the load circuit and configured to selectively charge (e.g., selectively provides a high voltage pulse to) an electrode assembly. The conductors and electrode assembly can be configured such that the arc, when present, will be lengthened due to the charge on the electrode assembly. For example, the electrical system can include an indication device operatively coupled to the energy source, with the energy source being configured to charge the electrode assembly in response to receiving from the indication device an indication of the arc being established the indication.

In another aspect, a system, such as a charging system, is provided. The system can include a coil. A connection module can be coupled to the coil and configured to allow the coil to communicate with an energy source (e.g., an alternating voltage source) to generate a magnetic field. A field-focusing element can be included, the field-focusing element acting to focus the magnetic field when the magnetic field varies in time at a predetermined rate. For example, the field-focusing element can be configured such that, when the coil is immersed in an independent magnetic field that varies in time at a predetermined rate, the field-focusing element acts to focus the independent magnetic field around the coil. In one embodiment, the field-focusing element may be configured to focus the magnetic field in an area separated from the coil by at least about 5 cm.

In some embodiments, the connection module may also include a power conversion module. In some embodiments, the field-focusing element can include a resonator configured to operate in at least two unique resonant frequencies. In some embodiments, the coil can be disposed behind a surface that is configured to allow a vehicle to be selectively positioned proximal thereto and in an area of focus of the magnetic field.

In yet another aspect, an apparatus, such as a vehicle, is provided. The apparatus can include a propulsion system (e.g., an electric motor, such as in a vehicle). An energy storage module can be configured to exchange energy with the propulsion system. A coil can be electrically coupled to the energy storage module. A field-focusing element may act to focus an independent magnetic field that varies in time at a predetermined rate around the coil when the coil is immersed in the independent magnetic field. In one embodiment, the field-focusing element can be configured to focus the magnetic field in an area separated from the coil by at least about 5 cm. In another embodiment, The coil can be configured to receive energy from the energy storage module to generate a magnetic field. The field-focusing element can be configured such that, when the magnetic field varies in time at a predetermined rate, the field-focusing element acts to focus the magnetic field.

In some embodiments, the field-focusing element can be configured to focus around the coil an independent magnetic field generated by a source separated from the coil by at least about 5 cm. In some embodiments, the propulsion system may be configured to selectively transport the coil so as to be disposed such that the field-focusing element acts to focus the independent magnetic field around the coil.

In still another aspect, a system is provided, which system includes a primary coil. A connection module can be coupled to the primary coil and configured to allow the primary coil to communicate with an energy source to generate a primary magnetic field. An energy storage module can also be included and can be configured to exchange energy with a propulsion system. A secondary coil can be electrically coupled to the energy storage module. A field-focusing element can be included, wherein when the primary magnetic field varies in time at a predetermined rate, the field-focusing element acts to focus the magnetic field around the secondary coil.

DRAWINGS

The following detailed description should be read with reference to the accompanying drawings in which like characters represent like parts throughout the drawings, wherein.

DETAILED DESCRIPTION

Figure 1:
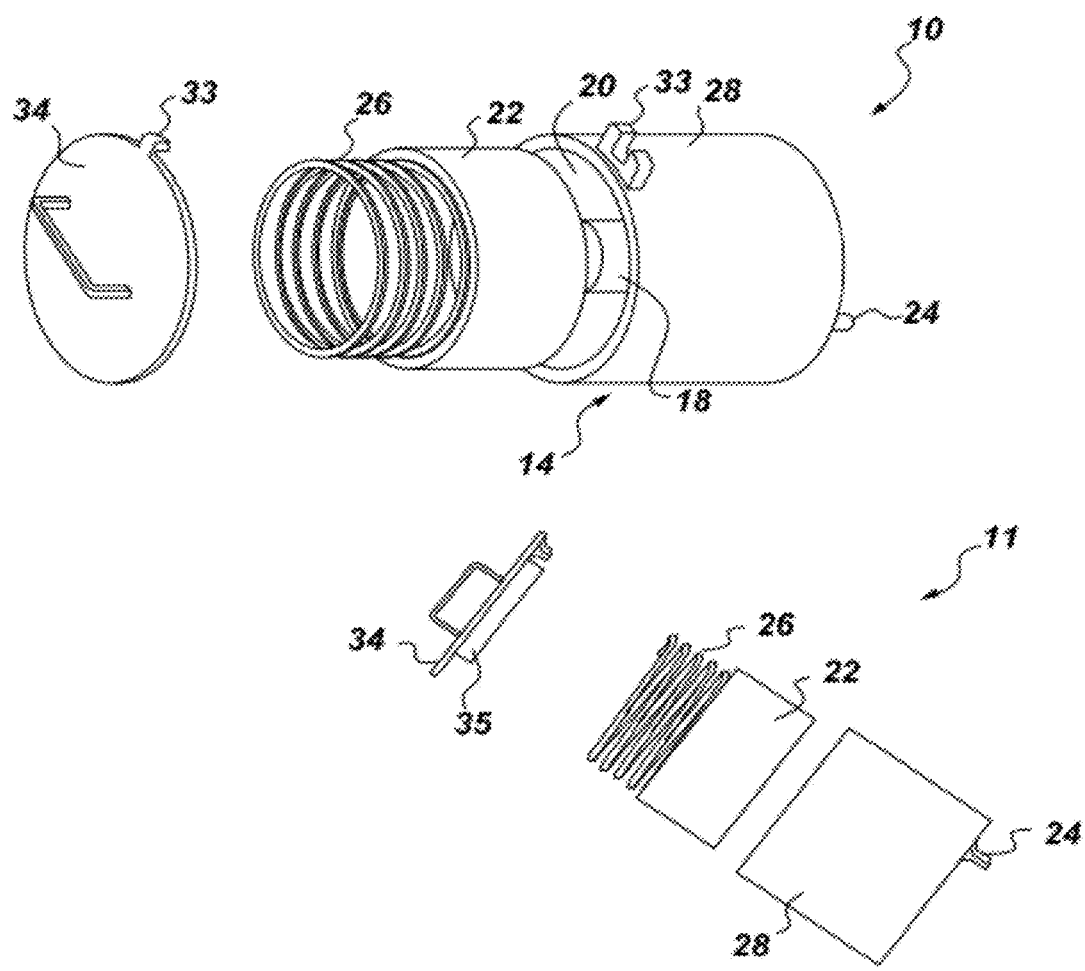
FIG. 1 illustrates an exploded view of a contactless charging system according to an example embodiment.

Example embodiments are described below in detail with reference to the accompanying drawings, where the same reference numerals denote the same parts throughout the drawings. Some of these embodiments may address the above and other needs.

As used herein, "contactless" means that a power cord, wire, or other tangible electrical conduit is absent for at least a portion of a power transfer circuit. Unless otherwise indicated by context or explicit language, "power," as used herein, refers to electrical power or electricity. The word "vehicle" is intended to include any non-fixed item of equipment, and specifically includes at least self-propelled vehicles. Examples of such vehicles include passenger vehicles, mass transit vehicles, locomotives, automated guided vehicles, and industrial equipment (such as forklifts and loaders). Examples of passenger vehicles include all-electric vehicles and plug-in hybrid electric vehicles. Other examples include mining equipment and semi-portable devices. The terms "primary coil" and "secondary coil" are provided with reference to the directional flow of power. In certain instances, power flow may be bi-directional, and the terms may be interchanged with each other. The phrases "connected to," "coupled to," and "in communication with" refer to any form of interaction between two or more entities, including mechanical, electrical, magnetic, electromagnetic, fluid, and thermal interaction. Two components may be coupled to each other even though they are not in direct contact with each other.

FIG. 1 illustrates an exploded view of a contactless charging system according to an example embodiment. A charging receptacle 14 is disposed on a vehicle (not shown) and illustrated as an inlet for purposes of example. In one embodiment, the charging receptacle 14 includes a cavity 20 for hosting a dielectric region 22, a projection 18 for hosting a secondary coil 24, and a field-focusing element 26. In one embodiment, the charging receptacle 14 comprises a housing 28 made of ferromagnetic material for example. In another embodiment, the charging receptacle housing 28 and projection 18 both comprise ferromagnetic material. Ferromagnetic material helps to minimize penetration of magnetic fields generated by the primary coil and field-focusing element into surrounding metal frames and additionally helps to minimize the electromagnetic interference with adjacent electronic systems. In one embodiment, as shown in FIG. 1, the dielectric region 22 encompasses the field-focusing element 26. Non-limiting examples of dielectric region materials include calcium copper titanate compositions and barium strontium titanate compositions. Using a dielectric enclosure around the field-focusing element 26 may improve the permittivity and thus result in enhanced field focusing from the field-focusing element 26. The charging receptacle 14 may further include a lid 34 disposed on the outside on the vehicle and optionally coupled by a hinge 33 to the housing 28 of the cavity 20. Reference numeral 11 illustrates another view of the charging receptacle 14. In one embodiment, a projection 35 on the lid 34 is configured to accommodate a charging handle (not shown in FIG. 1) during a charging operation.

The field-focusing element 26 can be used to focus a magnetic field from a primary coil 16 (as referenced in FIG. 3) on to the secondary coil 24. In one embodiment, the field-focusing element 26 includes a single loop coil. In another embodiment, the field-focusing element includes multiple turns such as in a split ring structure, a spiral structure, a Swiss-roll structure, or a helical coil (of uniform diameter, or of increasing/decreasing diameter, for example, so as to form a conical helix). Selection of a structure for a particular application is determined by the power handling capability, self resonating frequency, and the ability to focus the electromagnetic field in a particular direction to facilitate operation of the contactless charging system. For example, passenger electric vehicles may have storage systems with energy ratings of about 8 kWh to about 40 kWh. Such storage systems are configured for at least three levels of charging depending on the time required for charging. For example, a level one charging requires charging power of about 1.5 kW to about 7 kW, a level two charging requires charging power of about 10 kW to 15 kW, and a level three charging requires charging power of about 15 kW up to about 150 kW (with a level three charging requiring less charging time than level one and two chargings). Similarly for high power vehicles such as mining trucks, power requirements may be in the range of 200 kW or more. Such high power requirements need operating frequency to be less than a few MHz, and may be as low as about 20 kHz.

A Swiss-roll coil may be implemented as the field-focusing element to provide a compact resonator that may be configured to operate at frequencies from about 20 kHz up to about a few MHz. Swiss-roll resonators include spiral wrapped coils that may be embedded in high dielectric material (with a dielectric constant ranging from 10 to 100, for example) to achieve increased capacitance and inductance and hence a compact design. A single Swiss Roll resonator is expected to be capable of focusing a magnetic field up to few inches of distance.

Alternatively, a helical resonator may be embedded in dielectric region 22 and configured as a field-focusing structure. This embodiment of helical structure may include a wire wound in the form of a helix and, when used as magnetic field-focusing element, may achieve high Q factor. In one embodiment, coating the surface of the conductor in the helical structure with high conductivity material may help minimize skin effects in the magnetic field-focusing element at high frequencies, and hence enable the higher Q factor. A helical resonator is analogous to an array of dipoles and loops and designed for focusing magnetic field in an axial direction by optimizing the pitch and number of turns. In some cases, the helical resonator can be configured as conical helix in order to enhance the coupling efficiency.

The field-focusing element 26 may further include multiple resonators. In one embodiment, the field-focusing element 26 comprises at least two sets of resonators having self-resonant frequencies that are unique (in other words, that differ from each other). In such a configuration, power may be transferred through a first resonance frequency and data on a second resonance frequency. Alternatively, or additionally, power may be transferred in one direction through a first resonance frequency and power may be transferred in an opposing direction through a second resonance frequency. If desired, bi-directional power or power and data may be transferred. In one example, power is transferred in one direction via the first resonance frequency and data is transferred in an opposite direction via the second resonance frequency simultaneously.

As indicated above, a variety of structures can be utilised as the field-focusing element. The selection of a field-focusing element structure for a particular application can be determined by factors including, but not limited to, the size and self-resonating frequency of the field-focusing element, and the direction or directions in which the field is to be focused. More details regarding the structure and operation of various field-focusing elements and the conditions under which each might be selected are provided in U.S. patent application Ser. No. 12/731,497, filed on Mar. 25, 2010, the content of which is incorporated herein by reference in its entirety.

The secondary coil 24 disposed within the cavity may be coupled to an energy storage module (not shown) within an electric vehicle or a plug-in hybrid vehicle that is powered by an electric motor. The energy storage module may in turn be configured to supply power to the electric motor.

Figure 2A:
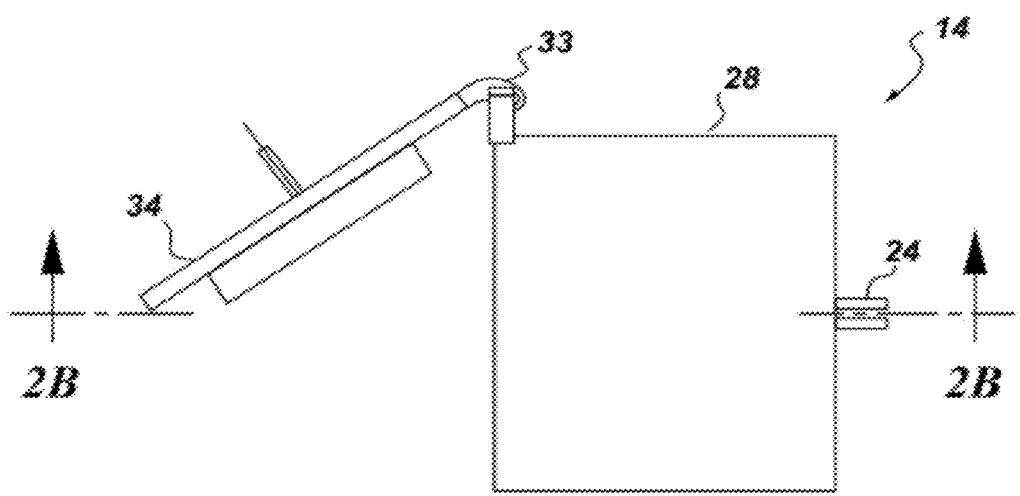
FIG. 2 illustrates a charging receptacle according to an example embodiment.
Figure 2B:
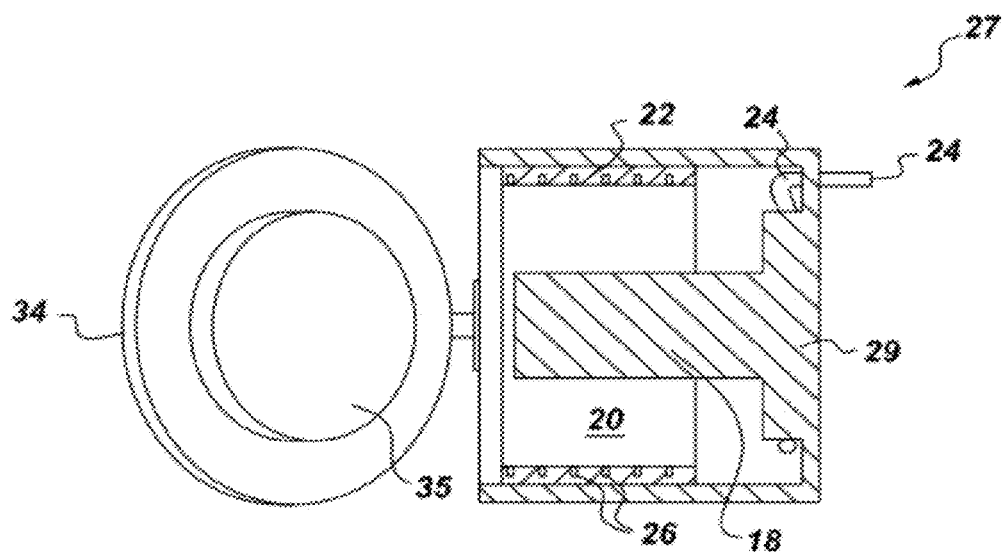
Figure 8:
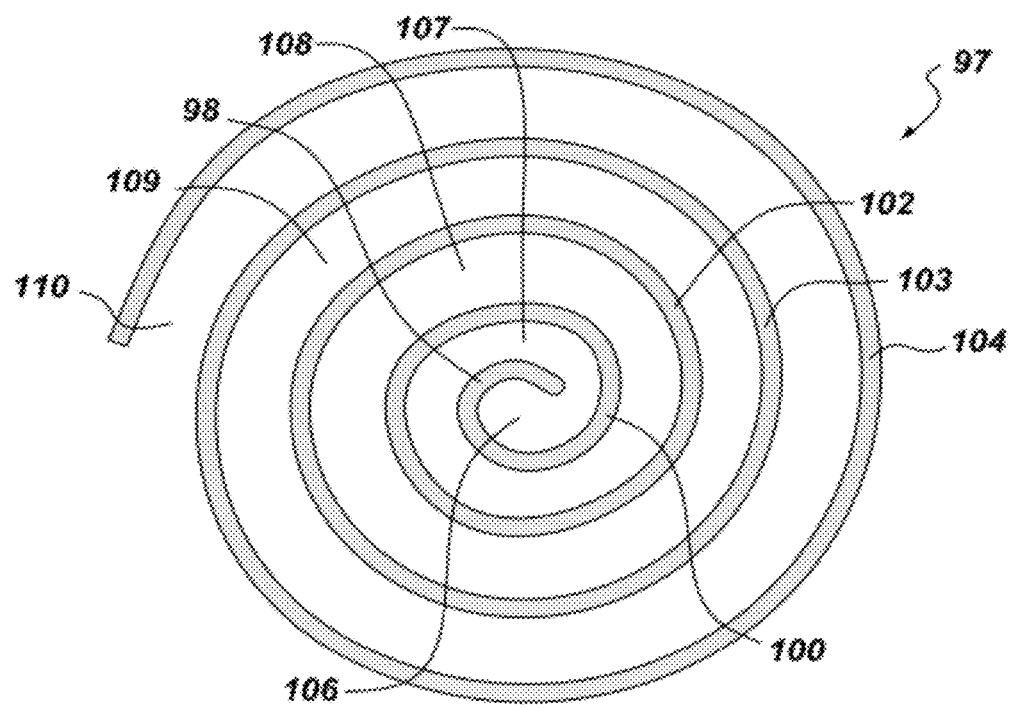
FIG. 8 illustrates a Swiss-roll resonator according to an example embodiment.

FIG. 2 illustrates the charging receptacle according to an example embodiment. The top view 14 illustrates the lid 34 hinged to the outer surface 28 of the cavity. The leads of the secondary coil 24 may be coupled to the electric motor or the storage system within the vehicle. A cut sectional view as referenced by the numeral 27 illustrates the projection 18 hosting the secondary coil 24 at the far end 25 within the cavity 20. The cut sectional view 27 also illustrates the field-focusing element 26 disposed proximate the dielectric region 22. For example, the dielectric region 22 may encompass the helical resonator 26 as illustrated by the cut section view 27. In another embodiment, the dielectric region 106-110 may be disposed between or wrapped around the coil regions 98-104 of a Swiss-roll resonator as illustrated by reference numeral 97 in FIG. 8. As discussed earlier, the projection 35 on the lid 34 is to accommodate a charging handle. During a charging operation, the lid hosts the charging handle and is in a closed position wherein the projection 35 along with the charging handle is accommodated within the cavity 20. After the charging, the lid 34 is replaced into the cavity 20 without the charging handle.

Figure 3:
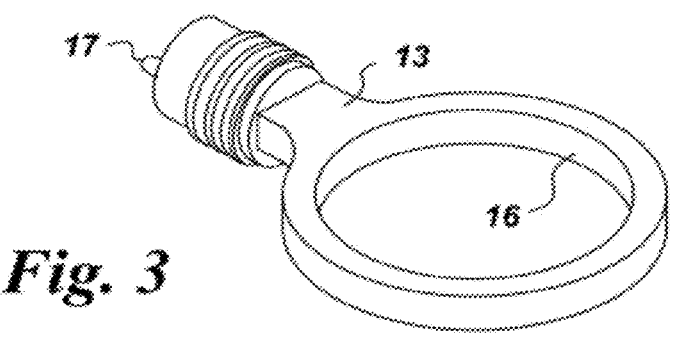
FIG. 3 illustrates a charging handle according to an example embodiment.

FIG. 3 illustrates a charging handle 13 according to an example embodiment. A primary coil 16 is disposed within a housing 12 and configured to be disposed on the projection 35 of the lid 34 as referenced in FIG. 2. The housing 12 may comprise a non-conducting and non-magnetic material such as plastic, for example. The primary coil 16 is further coupled to a charging station, which in turn is coupled to a power source (not shown) such as an alternating current (AC) power outlet of a domestic home or an industrial three-phase power outlet via the leads 17. The charging station converts frequency of the power received from the power source or utility from power frequency of 50/60 Hz to a resonance frequency of the field-focusing element to enable the efficient power transfer.

Figure 4:
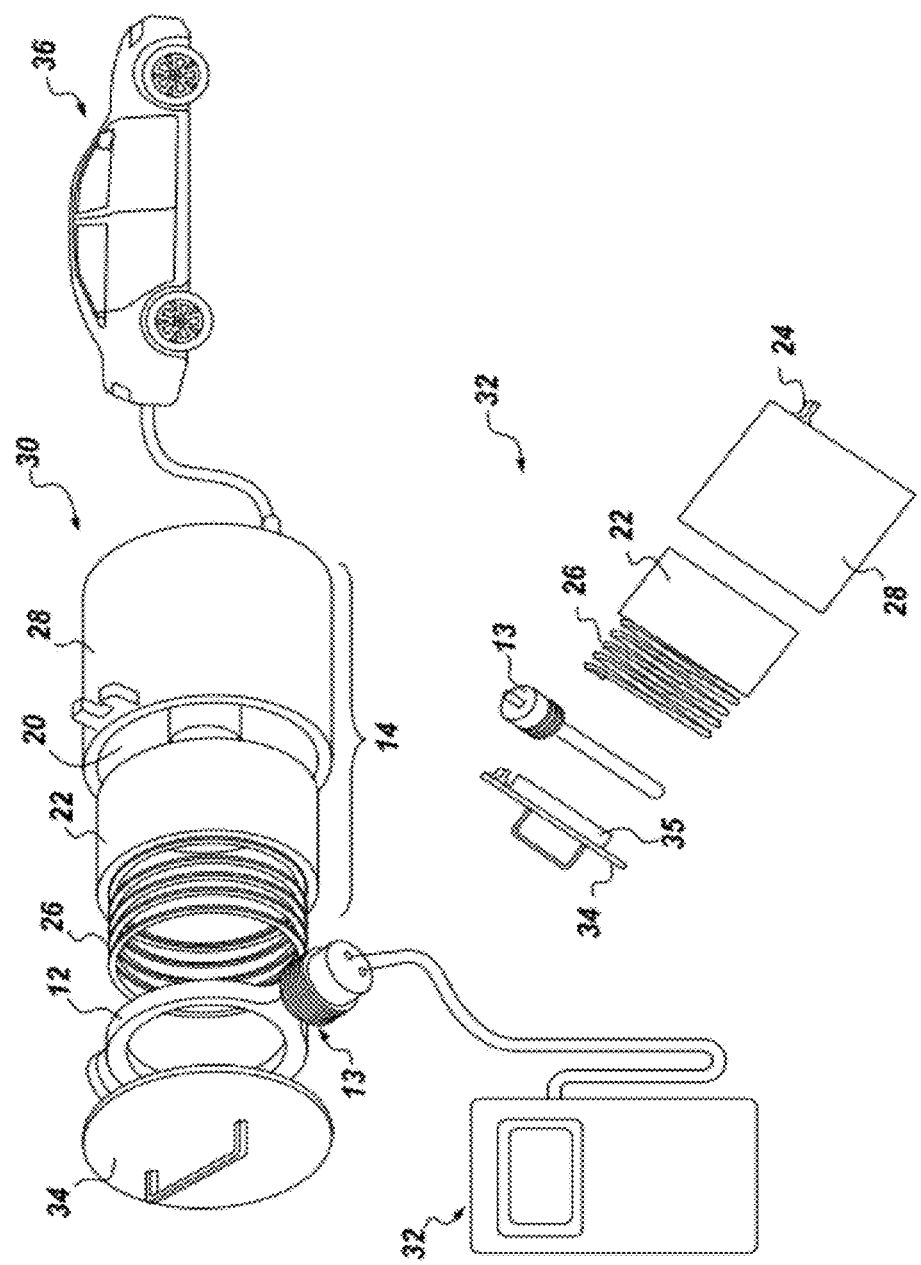
FIG. 4 illustrates a contactless charging system according to an example embodiment.

FIG. 4 illustrates a contactless charging system 30 according to another example embodiment. The charging handle housing 12 is mated into the projection 35 during a charging operation. The contactless charging system 30 includes a charging station 32 that may be coupled to a utility grid. The charging station 32 is adapted to supply power to a vehicle 36 that is capable of receiving power, for example, recharging the storage devices within the vehicle. Charging handle 13 is electrically coupled to the charging station 32. A charging receptacle 14 disposed on the vehicle 36 includes a cavity 20 having field-focusing element 26 and secondary coil 24 disposed within the cavity 20. As discussed above, secondary coil 24 may be coupled to an energy storage module within the vehicle that is powered by an electric motor. The energy storage module is configured to supply power to the electric motor to propel the vehicle. Reference numeral 31 illustrates another view of the contactless charging system 30.

Figure 5:
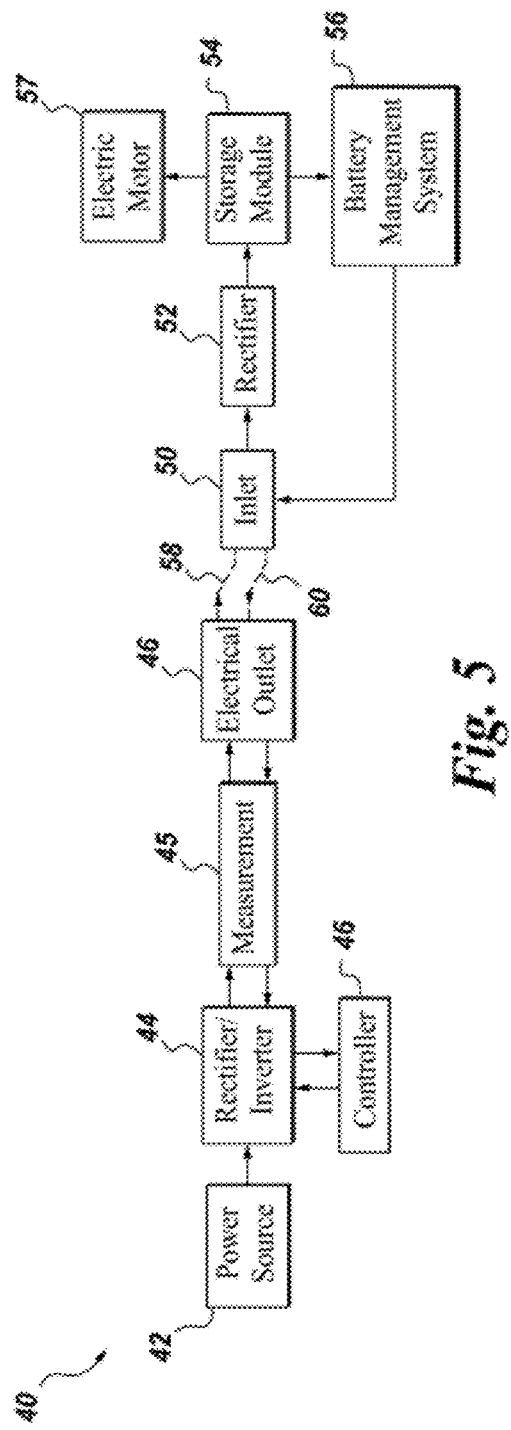
FIG. 5 illustrates a block diagram of a contactless charging system according to an example embodiment.

FIG. 5 illustrates a block diagram of a contactless charging system according to an example embodiment. The contactless charging system 40 includes a power source 42 that is coupled to a grid. The power source 42 is configured to supply single phase or three phase AC power. A rectifier/inverter module 44 coupled to the power source 42 comprises a rectifier which converts the AC power to direct current (DC) power and an inverter which then converts the rectified DC power to high frequency AC power. A controller 48 coupled to the rectifier/inverter module 44 controls the on and off states of switches of the rectifier/inverter module. An electrical outlet 46 is coupled to the rectifier/inverter module 44.

The electrical outlet 46, in one embodiment, includes a charging handle equipped with a primary coil for transmitting high frequency AC power from the rectifier/inverter module 44. An inlet 50 is disposed on a vehicle configured to receive power for charging purposes. The electrical outlet 46 and the inlet 50 are mechanically mated so that during charging operation, the inlet 50 accommodates electrical outlet 46 for receiving power. In one embodiment, the inlet 50 includes a field-focusing element enclosed within a dielectric region to focus a magnetic field and a secondary coil to receive power. In may be noted that, though electrical outlet 46 and inlet 50 are mechanically mated, the primary and secondary coils are not in physical contact. Power 58 is transferred in a contactless manner between the electrical outlet 46 and the inlet 50. The secondary coil may further be coupled to a rectifier 52 to convert high frequency AC power to a DC power suitable for charging a storage module 54. In one embodiment, the storage module 54 includes a battery or multiple batteries. The storage module 54 may be further coupled to an electric motor 57 configured to propel a vehicle (not shown in FIG. 4).

A battery management system 56 is coupled to the storage module 54 and configured to monitor the amount of charging required for the storage module 54. Furthermore, battery management system 56 may be configured to provide signals for use in controlling on and off states of switches of the rectifier/inverter module 44 such that the power flow into the storage module 54 is controlled. Such a feedback mechanism, in an example embodiment, is implemented via data transfer 60 in a contactless manner between the inlet 50 and the electrical outlet 46. For example, during a charging operation, the battery management system 56 may generate a signal when the storage module 54 is fully charged and does not require any more charging. Such signal may be transmitted to the controller 48 in a contactless manner via the inlet 50 and electrical outlet 46. Similarly, battery management system 56 may communicate via appropriate signals, the status of the storage module 54 at any stage during the charging operation.

In one embodiment, a power-flow measuring module 45 is coupled between the rectifier/inverter 44 and the primary coil in the electrical outlet 46. Power-flow measuring module 45 may be configured to measure the amount of power delivered from the electrical outlet. Such measurements may be used for utility billing purposes. Furthermore, such measurements help monitor abnormal operations that may occur, for example, during an incompatible charging handle being used for a vehicle or during a fault condition that may occur during a short circuit. During such abnormal conditions, an alarm device within the power-flow measuring module may be activated to warn the user to abort the operation.

Figure 6:
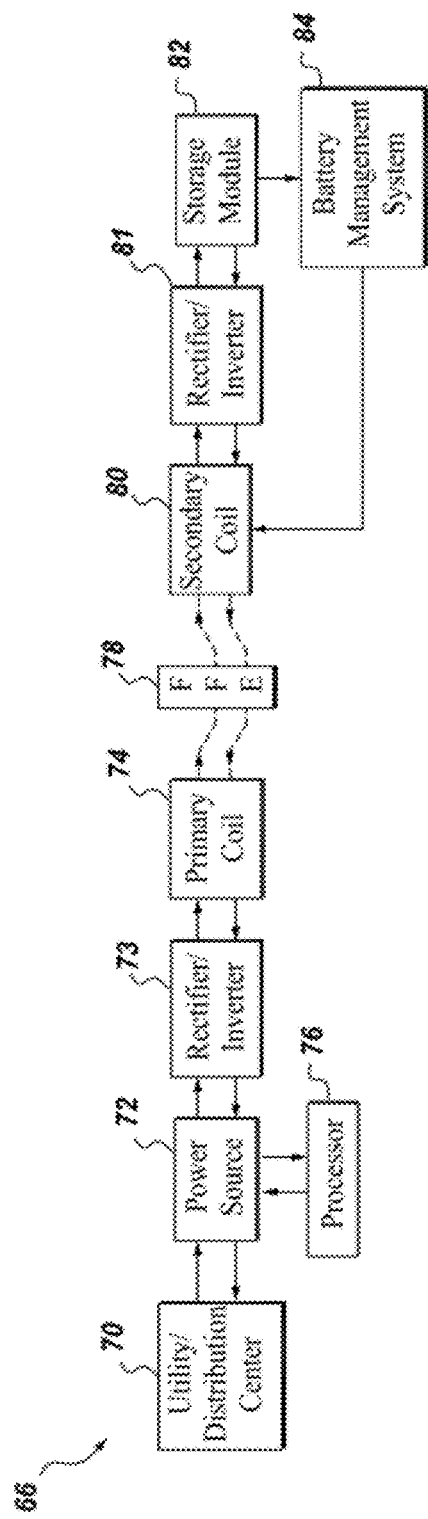
FIG. 6 illustrates a block diagram of an intelligent charging system according to an example embodiment.

FIG. 6 illustrates a block diagram of an intelligent charging system according to an example embodiment. The intelligent charging system 66 includes at least two sets of coils 74, 80, a field-focusing element 78, and is configured for providing multi-channel bi-directional power transfer between a power source 72 and a storage module 82 on a vehicle (not shown in FIG. 5). A rectifier/inverter 73 coupled to the power source 72 may be configured to convert power to high frequency AC power suitable for contactless power transmission. Another rectifier/inverter 81 coupled to the storage module 82 may also be configured to convert power to high frequency AC power. A battery management system 84 is coupled to the storage module 82 and configured to control a power flow to and from the storage module 82. A processor 76 is coupled to the power source and configured to communicate with an external control station 70. The external control station 70 may include, for example, a utility based power distribution unit or a distributed power generation unit. Several examples of distributed power generation units include photovoltaic modules, wind farms, and micro generation units. Several examples of utility distribution unit include substations and receiving stations coupled to a transmission grid.

In an example embodiment, while the primary and secondary coils are coupled, the intelligent charging system 66 may be configured to include smart grid capabilities such as optimum load utilization and enable functionality such as the transfer of power from the storage module to the grid when it appears that such power will be needed by the grid prior to being needed by the vehicle. In one embodiment, load data, such as the charging current and the power flow into the power source 72, may be monitored and communicated to the utility 70 via the processor 76. It may be noted that sharing such data with the utility may be advantageous in several aspects. For example, when multiple such vehicles are coupled to the grid at the same time during the night, multiple such intelligent systems as disclosed herein may be coupled configured to share the demand for load thereby relieving an overload condition on the grid. Additionally, if a vehicle is fully charged, excess power from such a vehicle may be pumped back to the grid to relieve new demand for power on the grid. Many such load optimization techniques may be implemented within the intelligent charging system 66. Further details of contactless power transfer systems in general and data transfer in particular can be found in U.S. patent application Ser. No. 12/820,208, filed on Jun. 22, 2010, the content of which is incorporated herein by reference in its entirety.

Figure 7:
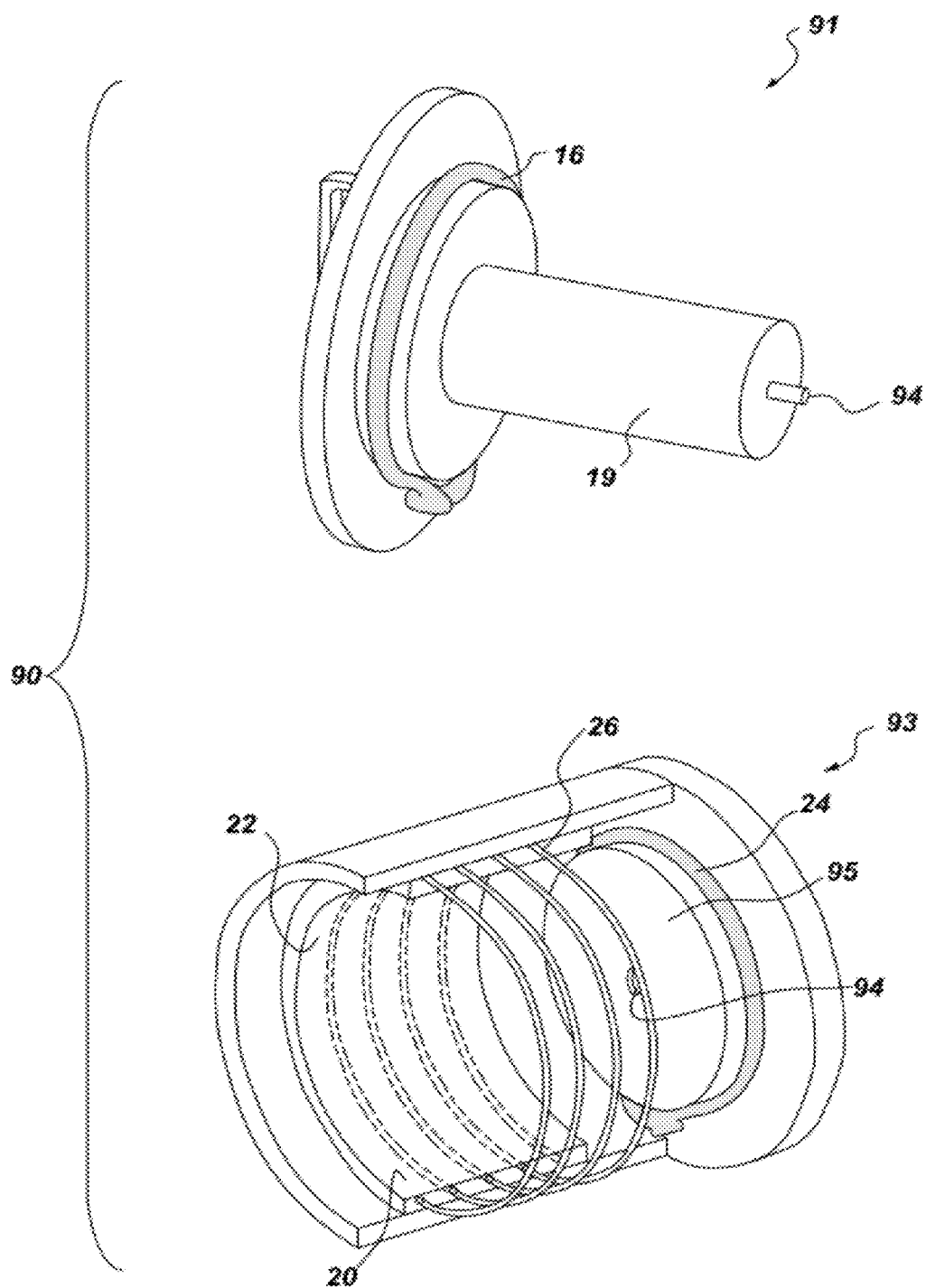
FIG. 7 illustrates an alternate embodiment of a contactless charging system according to an example embodiment.
Figure 9:
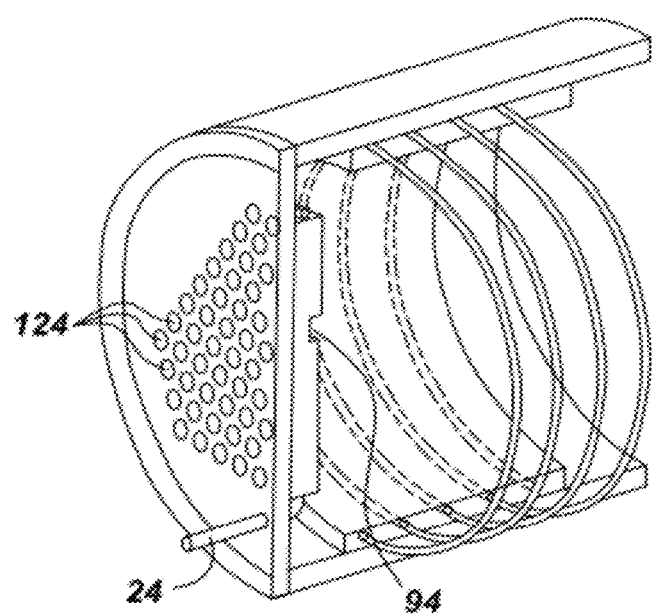
FIG. 9 illustrates charging receptacle according to an example embodiment.

FIG. 7 illustrates an alternate embodiment of a contactless charging system. The contactless charging system 90 includes a charging receptacle 93 that includes a cavity 20 to accommodate the dielectric region 22 and a field-focusing element 26. A projection 95 within the cavity 20 is configured to host a secondary coil 24. A charging handle 91 includes a projection 19 that is hosted within the cavity 20 during a charging operation. Alignment key 94 on the projection 19 may be used to align a fit into the hole 94 on the projection 95 within the charging receptacle 93 during a charging operation. The charging handle 91 further hosts a primary coil 16 coupled to the utility grid via a charging station. In an alternate embodiment, the charging receptacle 93 is further configured to receive liquid fuel via multiple perforations such as 124 as referenced in FIG. 9. It may be noted that such an arrangement is advantageous in plug-in hybrid electrical vehicles that can operate using fuel or electricity. In one embodiment, a housing for cavity 20, projection 95, and projection 19 each comprise ferromagnetic material.

Advantageously, contactless charging systems as disclosed herein may be more efficient compared to prior induction based charging systems. Further, high efficiencies may be achieved (such as about 90% or more for a 6.6 kW system) over a distance of few millimeters. The contactless charging systems may further be relatively insensitive to any misalignment between the charging handle and the charging receptacle. Furthermore, such contactless charging systems may be relatively immune to load variations that occur at various stages of battery charging/discharging. Bi-directional power transfer enables simultaneous transfer of power and data. Power-flow monitor and alarm functions may be used to enable overall system protection during abnormal operations such as in-compatible devices or faulty device. Intelligent charging systems disclosed herein may be used to enable smart grid capabilities such as load optimization and resource sharing.

Figure 10:
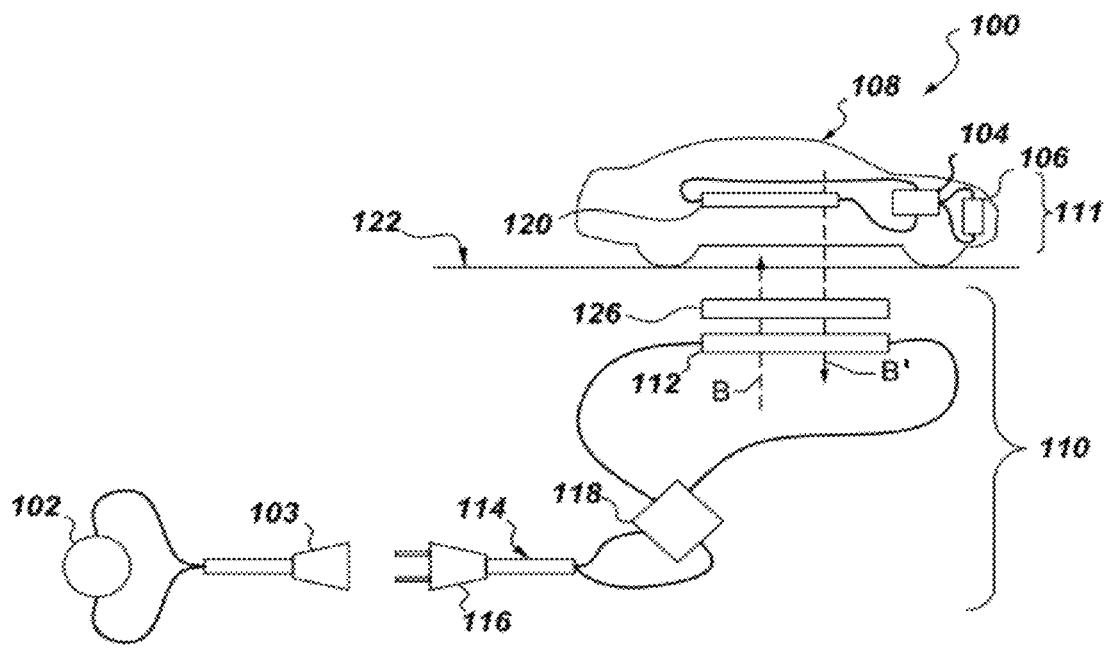
FIG. 10 illustrates a charging system according to another example embodiment.

Referring to FIG. 10, therein is shown a system, such as a charging system 100. As discussed in more detail below, the charging system 100 may be configured to facilitate contactless energy transfer between an energy source, such as an alternating voltage source 102 (e.g., as provided via an AC power outlet 103 of a domestic home or an industrial three-phase power outlet), and an energy storage module, such as a battery 104, associated with (e.g., configured to exchange energy with) a propulsion system, such as an electric motor 106 of a vehicle 108 (e.g., an automobile, an airplane, a train, a sea vessel, etc.).

The charging system 100 (also referred to as a "power transfer module" or "power transfer system") can include an energy transmission module 110 and an energy reception module 111. The energy transmission module 110 can include a coil 112 (also referred to as a "primary coil"). A connection module 114 can be coupled to the primary coil 112 and configured to allow the coil to communicate with the voltage source 102 to generate a magnetic field. For example, the connection module 114 may include a plug 116 to allow for connection between the voltage source 102 and an end of the primary coil 112. The primary coil 112 can be configured to generate a magnetic field B (also referred to as the "primary magnetic field") as current flows through the primary coil under the influence of the voltage source 102.

The energy transmission module 110 can also include a field-focusing element 126. Generally, the field-focusing element 126 can be configured such that when the magnetic field B varies in time at a predetermined rate, the field-focusing element acts to focus the magnetic field. For example, as discussed above, the field-focusing element 126 may be configured as a resonator, having any of the configurations contemplated above, including, for example, a single loop coil, a split ring structure, a spiral structure, a Swiss-roll structure, a helical coil, and/or the like.

The voltage source 102 may be configured to provide a voltage that alternates at a source frequency (e.g., 50/60 Hz where the voltage source is supplied by a conventional utility company). The charging system 100 can further include a power conversion module 118, for example, as part of the connection module 114. The power conversion module 118 can be configured to convert power received from the voltage source 102 from the source frequency to a resonance frequency of the field-focusing element 126, thereby enabling the magnetic field B to be focused. If needed, a separate power conversion module (not shown) can be located in the vehicle 108 and configured to convert the AC power provided by the voltage source 102 to DC power for use in charging the battery 104.

The battery 104 may be configured to exchange energy with the electric motor 106. A secondary coil 120 can be electrically coupled to the battery 104. When appropriately positioned, the secondary coil 120 can electromagnetically couple with the primary coil 112, thereby facilitating power transfer between the voltage source 102 (coupled to the primary coil) and the battery 104 (coupled to the secondary coil). For example, the vehicle 108 can be positioned such that the secondary coil 120 is disposed so as to be immersed in the magnetic field B generated by the primary coil 112. When the magnetic field B varies in time at a predetermined rate (i.e., at a resonance frequency of the field-focusing element 126), the field-focusing element can act to focus the magnetic field around the secondary coil 120.

In some embodiments, the field-focusing element 126 may be configured to focus the magnetic field B in an area separated from the primary coil 112 by at least about 5 cm, and in some cases by as much as 20-30 cm or more. This may facilitate disposing the coil 112 behind a surface 122, which surface is configured to allow a vehicle to be selectively positioned (via the motor 106) proximal thereto and in an area of focus of the magnetic field B. For example, in one embodiment, the vehicle 108 may be an automobile, and the surface 122 may be a floor onto which the automobile may be driven so as to position the secondary coil 120 appropriately in a location immersed in a focus area of the magnetic field B. In another embodiment, the vehicle 108 may be an automobile, and the surface 122 may be a wall adjacent to which the automobile may be parked so as to position the secondary coil 120 appropriately in a location immersed in a focus area of the magnetic field B.

As discussed above, the charging system 100 may enable energy transfer from the voltage source 102 to the battery 104. In some embodiments, the charging system 100 may also be configured to allow energy transfer from the battery 104 to the energy transmission module 110 (and on from there to any loads connected to the energy transmission module). For example, the battery 104 can supply a voltage across the secondary coil 120; this voltage can be made to alternate through a power conversion module (not shown) located in the vehicle 108. As a result, a magnetic field B' may be generated (which magnetic field is independent of the magnetic field generated by the primary coil 112, and is therefore referred to as an "independent magnetic field"). The field-focusing element 126 can be configured such that, when the primary coil 112 is immersed in the independent magnetic field B', and the independent magnetic field varies in time at a resonance frequency of the field-focusing element, the field-focusing element can act to focus the independent magnetic field around the primary coil. In some embodiments, the field-focusing element 126 may be configured to focus the independent magnetic field B' around the primary coil 112 where the primary coil is separated from the secondary coil 120 by at least about 5 cm, and in some cases by as much as 20-30 cm or more.

Figure 11:
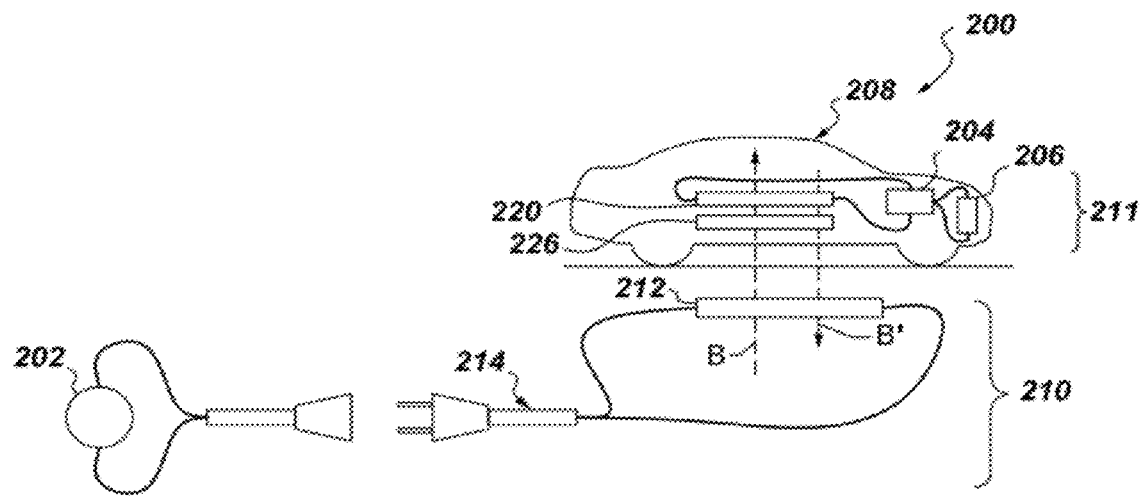
FIG. 11 illustrates a charging system according to yet another example embodiment.

In another embodiment, the field-focusing element may be co-located with the energy reception module, rather than the energy transmission module as discussed above. For example, referring to FIG. 11, therein is shown a system, such as a charging system 200. The charging system 200 may be configured to facilitate contactless energy transfer between an energy source, such as an alternating voltage source 202, and an energy storage module, such as a battery 204, associated with a propulsion system, such as an electric motor 206 of a vehicle 208.

The charging system 200 can include an energy transmission module 210 and an energy reception module 211. The energy transmission module 210 can include a coil 212 (also referred to as a "primary coil"). A connection module 214 can be coupled to the primary coil 212 and configured to allow the coil to communicate with the voltage source 202 to generate a magnetic field. The primary coil 212 can be configured to generate a magnetic field B (also referred to as the "primary magnetic field") as current flows through the primary coil under the influence of the voltage source 202.

A coil 220, referred to as a "secondary coil," can be included in the energy reception module 211 (e.g., in the vehicle 208) and electrically coupled to the battery 204, the secondary coil electromagnetically coupling with the primary coil 212. For example, the vehicle 208 can be positioned such that the secondary coil 220 is disposed so as to be immersed in the magnetic field B generated by the primary coil 212. A field-focusing element 226 can also be included in the energy reception module 211, and can be configured such that when the magnetic field B varies in time at the resonance frequency of the field-focusing element, the field-focusing element can act to focus the magnetic field around the secondary coil 220. If necessary, the energy transmission module 210 can include a power conversion module (not shown) configured to convert power received from the voltage source 202 from a source frequency to a resonance frequency of the field-focusing element 226.

The charging system 200 may also be configured to allow energy transfer from the battery 204 to the energy transmission module 210. The battery 204 can supply a voltage across the secondary coil 220; this voltage can be made to alternate through a power conversion module (not shown) located in the vehicle 208. As a result, a magnetic field B' may be generated (which magnetic field is independent of the magnetic field generated by the primary coil 212, and is therefore referred to as an "independent magnetic field"). The field-focusing element 226 can be configured such that, when the primary coil 212 is immersed in the independent magnetic field B', and the independent magnetic field varies in time at the resonance frequency of the field-focusing element, the field-focusing element can act to focus the independent magnetic field around the primary coil.

Figure 12:
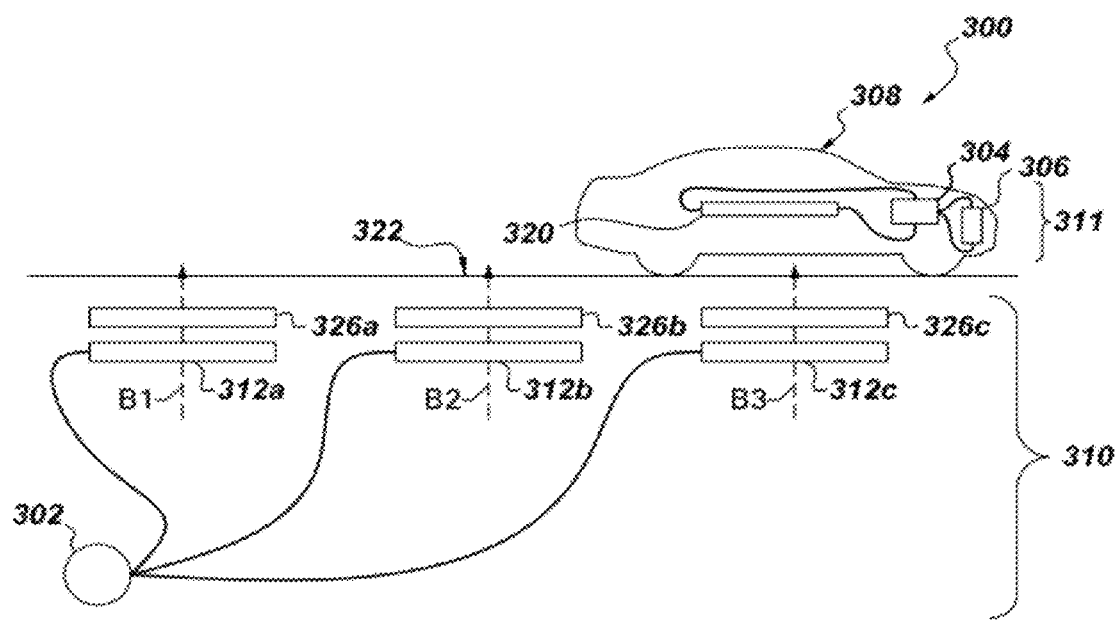
FIG. 12 illustrates a charging system according to still another example embodiment.

Referring to FIG. 12, therein is shown a system, such as a charging system 300, which charging system may be configured to facilitate contactless energy transfer between an energy source, such as an alternating voltage source 302, and an energy storage module, such as a battery 304, associated with an electric motor 306 of a vehicle 308. The charging system 300 can include an energy transmission module 310 and an energy reception module 311. The energy transmission module 310 can include a series of primary coils 312a-312c coupled to the voltage source 302. In the figure, three primary coils 312a-312c are depicted, but the energy transmission module 310 could include more or fewer primary coils. Each of the coils 312a-312c can be configured to communicate with the voltage source 102 to generate a respective magnetic field B1, B2, B3. The energy transmission module 310 can also include a series of field-focusing elements 326a-326c. Each field-focusing element 326a-326c can act to focus (under the appropriate conditions, as discussed above) the magnetic field generated by a respective primary coil 312a-312c. The primary coils 312a-312c and the field-focusing elements 326a-326c can be positioned, for example, under a surface 322.

A secondary coil 320 can be electrically coupled to the battery 304. When appropriately positioned, the secondary coil 320 can electromagnetically couple with one or more of the primary coils 312a-312c, thereby facilitating power transfer between the voltage source 302 (coupled to the primary coil) and the battery 304 (coupled to the secondary coil). For example, in some cases, the vehicle 308 can be translated over the surface 322 (e.g., driven using the motor 306), such that the secondary coil 320 is successively immersed in the respective magnetic fields B1, B2, B3, thereby allowing the battery 304 to be relatively continuously charged while the vehicle is in motion. In an alternative embodiment, a single field-focusing element can be included in the vehicle 308 proximal to the secondary coil 320, thereby potentially alleviating the need for multiple field-focusing elements 326a-c associated with each of the respective primary coils 312a-312c.

Figure 13:
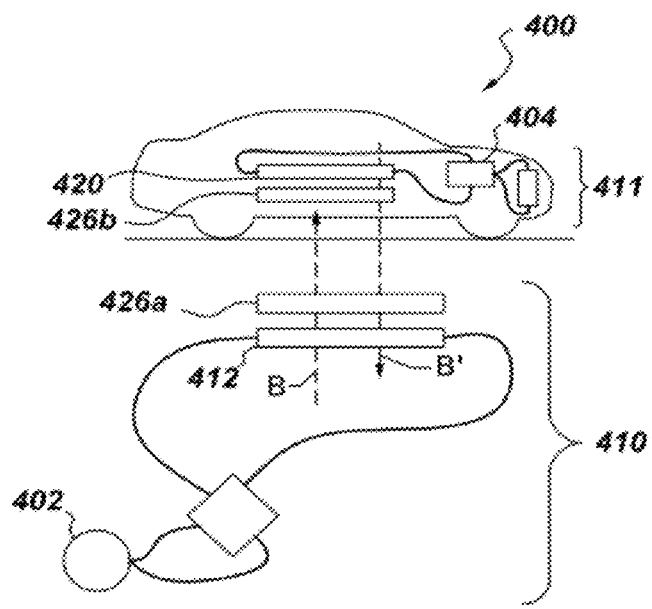
FIG. 13 illustrates a charging system according to yet another example embodiment.

While only certain features of the invention have been illustrated and described herein, many modifications and changes will occur to those skilled in the art. For example, while some embodiments have been described as including a single field-focusing element configured to facilitate power transfer in one direction through a first resonance frequency and power transfer in an opposing direction on a second resonance frequency, other embodiments may include two independent field-focusing elements. For example, referring to FIG. 13, therein is shown a charging system 400 configured to facilitate contactless energy transfer between an alternating voltage source 402 and a battery 404. The charging system 400 can include an energy transmission module 410 and an energy reception module 411. The energy transmission module 410 can include a primary coil 412 that communicates with the voltage source 402 to generate a primary magnetic field B.

A secondary coil 420 can be included in the energy reception module 411 and electrically coupled to the battery 404, the secondary coil electromagnetically coupling with the primary coil 412 (for example, being positioned such that the secondary coil 420 is disposed so as to be immersed in the magnetic field B generated by the primary coil 412). A first field-focusing element 426a can also be included in the energy transmission module 410, and can be configured such that when the magnetic field B varies in time at a resonance frequency of the first field-focusing element (the "first resonance frequency"), the first field-focusing element can act to focus the magnetic field around the secondary coil 420. If necessary, the energy transmission module 410 can include a power conversion module (not shown) configured to convert power received from the voltage source 402 from a source frequency to a resonance frequency of the first field-focusing element 426a.

The charging system 400 may also be configured to allow energy transfer from the battery 404 to the energy transmission module 410. The battery 404 can supply a voltage across the secondary coil 420; this voltage can be made to alternate through a power conversion module (not shown). As a result, a secondary magnetic field B' may be generated. A second field-focusing element 426b can be disposed in the energy reception module 411 configured such that, when the primary coil 412 is immersed in the independent magnetic field B', and the secondary magnetic field varies in time at a resonance frequency of the second field-focusing element (the "second resonance frequency"), the second field-focusing element can act to focus the secondary magnetic field around the primary coil.

The second field-focusing element 426b in the energy reception module 411 may be configured to focus the primary magnetic field B, when varying at the first resonance frequency, towards the secondary coil 420 for charging the battery 404. The first field-focusing element 426a in the transmission module 410 can be configured to focus the secondary field B', when varying at the second resonance frequency, towards the primary coil 412 for transferring power from battery 404 to the source 402. Alternatively, first and second field-focusing elements 426a, 426b can be configured to focus magnetic fields varying at the first and second resonance frequencies, respectively.

It is, therefore, to be understood that the appended claims are intended to cover all such modifications and changes as fall within the true spirit of the invention.

What is claimed:

1. A system comprising:
    a primary coil;
    a connection module coupled to said primary coil and configured to allow said primary coil to communicate with an energy source to generate a primary magnetic field;
    a propulsion system;
    an energy storage module configured to exchange energy with said propulsion system;
    a secondary coil electrically coupled to said energy storage module; and
    a field-focusing element comprising a plurality of resonators,
    wherein when the primary magnetic field varies in time at a predetermined rate, said plurality of resonators upon excitation from the primary coil interfere constructively in a direction of said secondary coil and interfere destructively in a remaining space to focus the magnetic field received from said primary coil around said secondary coil, wherein said secondary coil is configured to receive energy from said energy storage module to generate a secondary magnetic field, and wherein said field-focusing element is configured such that, when the secondary magnetic field varies in time at a predetermined rate, said field-focusing element acts to focus the secondary magnetic field around said primary coil.

2. The system of claim 1, wherein said primary coil and said secondary coil are separated by at least about 5 cm when the primary magnetic field is focused around said secondary coil.

3. The system of claim 1, wherein said propulsion system is configured to selectively transport said secondary coil so as to be disposed such that said field-focusing element acts to focus the primary magnetic field around said secondary coil.

4. The system of claim 1, wherein said energy storage module includes at least one battery.

5. The system of claim 1, wherein said primary coil is disposed behind a surface that is configured to allow said propulsion system to be selectively positioned proximal thereto and in an area of focus of the primary magnetic field.

* * * * *